United States Patent
Haghgooie et al.

(10) Patent No.: US 6,357,409 B1
(45) Date of Patent: Mar. 19, 2002

(54) METHOD AND SYSTEM FOR STARTING A CAMLESS INTERNAL COMBUSTION ENGINE

(75) Inventors: Mohammad Haghgooie, Ann Arbor; Mazen Hammoud, Dearborn, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/577,030

(22) Filed: May 23, 2000

(51) Int. Cl.$^7$ .................... F01L 13/08; F02D 43/04
(52) U.S. Cl. .................... 123/179.3; 123/179.5; 123/182.1
(58) Field of Search .............. 123/179.3, 179.5, 123/179.16, 179.17, 179.18, 182.1, 179.1, 90.11; 701/113

(56) References Cited

U.S. PATENT DOCUMENTS

| | | | |
|---|---|---|---|
| 5,219,397 A | | 6/1993 | Jones |
| 5,284,116 A | * | 2/1994 | Richeson, Jr. ........... 123/90.11 |
| 5,596,956 A | | 1/1997 | Ogawa et al. |
| 5,713,320 A | | 2/1998 | Pfaff et al. |
| 5,909,729 A | | 6/1999 | Yamaoka et al. |

FOREIGN PATENT DOCUMENTS

| | | | | |
|---|---|---|---|---|
| FR | 2 768 466 A1 | * | 3/1999 | ........... F02N/11/00 |
| JP | 2000-97059 A | * | 4/2000 | ........... F02D/13/02 |
| WO | WO-99/09313 A1 | * | 2/1999 | ........... F02N/17/08 |

* cited by examiner

Primary Examiner—Andrew M. Dolinar

(57) ABSTRACT

A method for starting a camless internal combustion engine in response to a start signal, the internal combustion engine having a crankshaft and multiple cylinders each having one or more actuators for electronically actuating corresponding intake and exhaust valves, the internal combustion engine being mechanically coupled via the crankshaft to a starter motor, the starter motor being activated in response to the start signal, the method including the steps of: positioning each of the valves in accordance with a predetermined valve initial position, the valves being positioned so as to allow the flow of air in and out of each of the cylinders; rotating the crankshaft via the starter to a target idle speed for the engine; activating each of the valves in accordance with a predetermined valve activation sequence when the rotational speed of the crankshaft equals or exceeds the target idle speed; and activating each of the cylinders in accordance with a predetermined cylinder activation sequence after the valves have been activated.

6 Claims, 3 Drawing Sheets

METHOD AND SYSTEM FOR STARTING A CAMLESS INTERNAL COMBUSTION ENGINE

FIELD OF THE INVENTION

The present invention relates in general to a method and system for operating a camless internal combustion engine. More particularly, the invention relates to a method and system starting a camless internal combustion engine.

BACKGROUND OF THE INVENTION

Conventional starting systems for cam-based internal combustion engines typically include an ignition switch, a battery, a solenoid and a starter motor. When the ignition switch is turned to the ignition or start position, an electrical circuit is completed between the starter motor and the battery via the solenoid and current is supplied to the starter motor. The starter motor, which is mechanically coupled to the crankshaft, is used to crank the engine until the combustion process begins.

The cranking process, however, typically involves the turning of camshafts and actuation of corresponding intake and exhaust valves. As such, because the valves are actuated, the starter may have to crank through one or more compression strokes of the various cylinders prior to the actual start of the combustion process. This results in additional mechanical work required for engine start-up, and as such, an increased amount of required electrical power from the starting system. The required electrical power is often much more than what is necessary to actually start the engine.

The inventor's of the method and system described herein have recognized an advantage of using camless internal combustion engines to minimize the amount of electrical energy required for engine start-up. Camless internal combustion engines feature electronically-actuated valves which can be operated to provide variability in valve timing, duration and lift for each of valves. The valves are typically actuated using electromechanical or electrohydraulic actuators, and as such can be actuated as a function of one or more engine parameters such as speed, demanded engine torque or crankshaft angular position, to achieve optimal or desired engine performance. The inventors have recognized the advantage of valve timing, duration and lift variability as applied to optimizing the engine start-up process of a camless internal combustion engine.

SUMMARY OF THE INVENTION

The aforedescribed limitations and inadequacies of conventional engine startup methods and systems are substantially overcome by the present invention, in which a primary object is to provide a method and system for starting a camless internal combustion engine while minimizing the amount of electrical energy required for engine start-up.

The above object is achieved by a method for starting a camless internal combustion engine in response to a start signal, wherein the internal combustion engine includes a crankshaft and multiple cylinders each having one or more actuators for electronically actuating corresponding intake and exhaust valves. The internal combustion engine is mechanically coupled via the crankshaft to a starter motor, and the starter motor in turn is activated in response to the start signal. The method includes the steps of: positioning each of the valves in accordance with a predetermined valve initial position, wherein the valves are positioned so as to allow the flow of air in and out of each of the cylinders; rotating the crankshaft via the starter to a target idle speed for the engine; activating each of the valves in accordance with a predetermined valve activation sequence when the rotational speed of the crankshaft equals or exceeds the target idle speed; and activating each of the cylinders in accordance with a predetermined cylinder activation sequence after the valves have been activated.

An advantage of the above method is that by setting the valves to an initial position that allows for air flow in and out of cylinders, the amount of mechanical work required from the starter to crank the engine is substantially reduced. Additionally, because valve operation is delayed until the engine is cranked to the target idle speed, further mechanical work is avoided until a time the combustion process can be most optimally started. Accordingly, because the amount of required mechanical work is reduced, the electrical requirements of the starting system are reduced.

In accordance with another aspect of the present invention, a corresponding system for starting a camless internal combustion is provided, the system including: a start switch for generating a start signal; a starter motor mechanically coupled to the crankshaft for rotating the crankshaft to a target idle speed, the starter motor being activated in response to the start signal; a sensor for indicating the speed of the rotating crankshaft; and an engine controller coupled to the sensor for monitoring the rotational speed of the crankshaft and to the start switch for sensing the occurrence or presence of the start signal . The engine controller further provides valve initialization control signals to position each of the valves in accordance with a predetermined valve initial position, the valves for each of the cylinders being positioned so as to allow the flow of air in and out of each of the cylinders. Valve activation control signals are also provided by the engine controller to each of the valves when the rotational speed of the crankshaft equals or exceeds the target idle speed, and for activating each of the cylinders after the valves have been activated.

Still further, in accordance with yet another aspect of the present invention, an article of manufacture is provided for starting a camless internal combustion engine in response to a start signal, the internal combustion engine having a crankshaft and multiple cylinders each having one or more actuators for electronically actuating corresponding intake and exhaust valves. As previously described, the internal combustion engine is mechanically coupled via the crankshaft to a starter motor, the starter motor being activated in response to the start signal. The article of manufacture includes: a computer usable medium and a computer readable program code embodied in the computer usable medium for directing the computer to perform the steps of: monitoring the rotational speed of the crankshaft and for sensing the start signal; providing valve initialization control signals to position each of the valves in accordance with a predetermined valve initial position, the valves for each of the cylinders being positioned so as to allow the flow of air in and out of each of the cylinders; providing valve activation control signals to each of the valves when the rotational speed of the crankshaft equals or exceeds the target idle speed; and activating each of the cylinders after the valves have been activated.

Further objects, features and advantages of the invention will become apparent from the following detailed description taken in conjunction with the accompanying figures showing illustrative embodiments of the invention.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein.

DETAILED DESCRIPTION OF THE PREFERRED EMBODIMENTS

Figure 1:
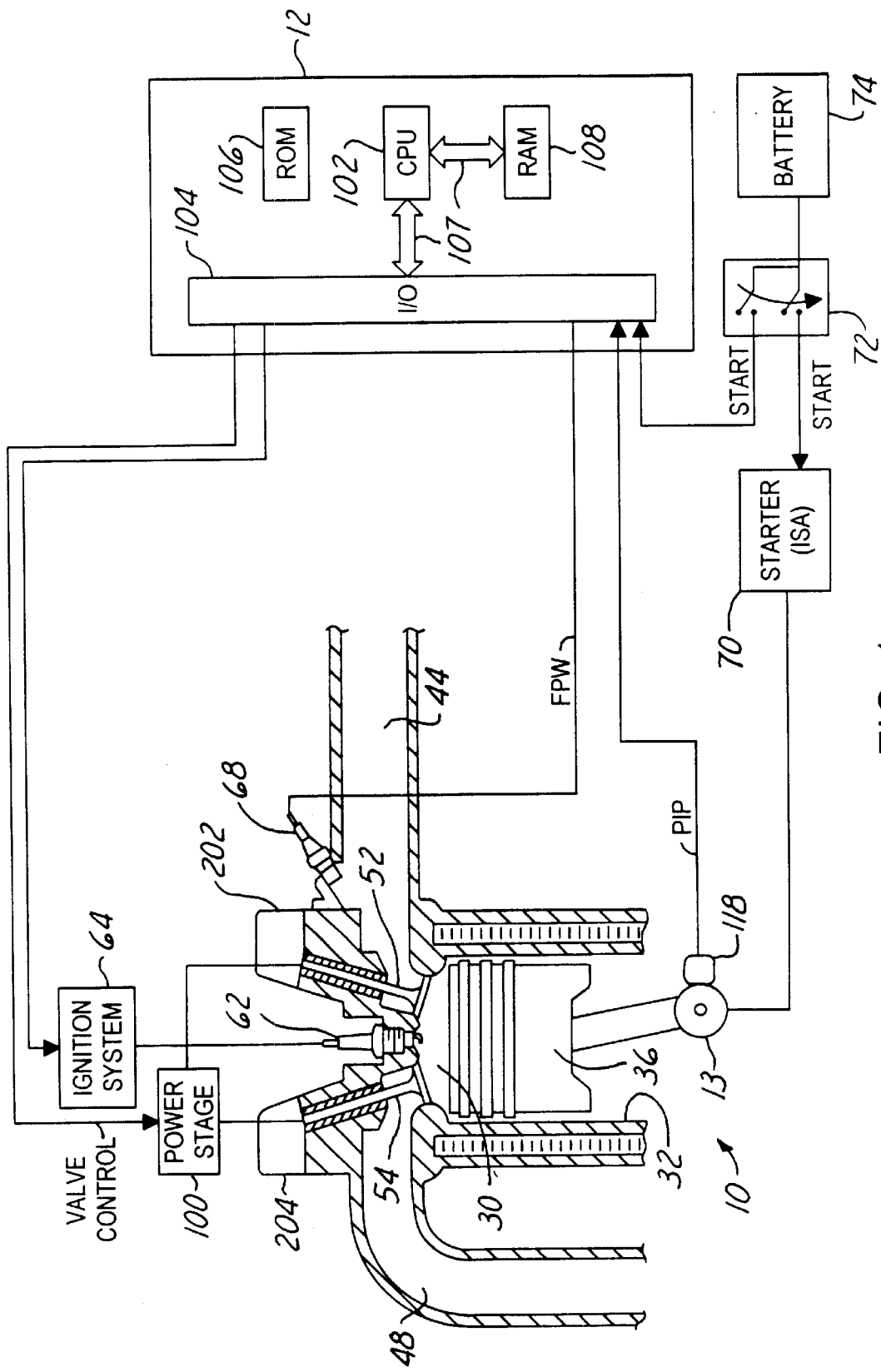
FIG. 1 is a block diagram of a camless internal combustion engine using the engine starting method and system of the present invention.

FIG. 1 shows a block diagram of a camless internal combustion engine 10 using a valve control method and system in accordance with the present invention. The engine 10 includes a plurality of cylinders (only one shown) each having a combustion chamber 30 and cylinder walls 32 in cooperation with piston 36 positioned therein and coupled to a crankshaft 13. The combustion chamber 30 communicates with corresponding intake and exhaust manifolds 44 and 48, respectively, via intake and exhaust valves 52 and 54. The intake and exhaust valves 52 and 54 are actuated via corresponding electromechanical or electrohydraulic valve actuators 202 and 204, respectively, each having one or more actuator components as shown and described below with reference to FIG. 2. The control signals required for valve actuated are provided via a power stage 100 as further shown in FIG. 1.

Figure 2:
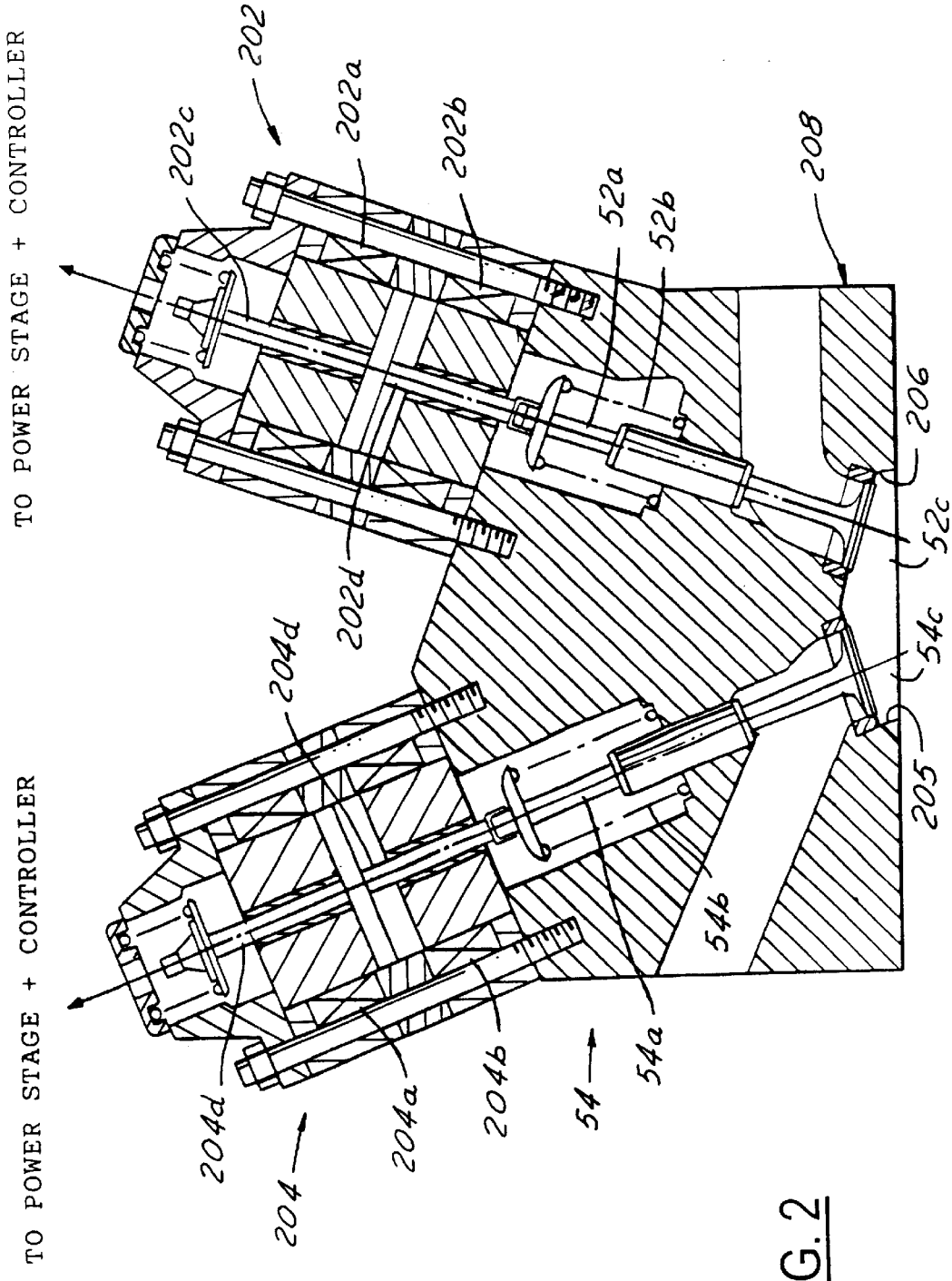
FIG. 2 is a detailed schematic of exemplary electromechanical valves controlled by the valve control method and system of the present invention.

FIG. 2 shows a detailed schematic of the intake and exhaust valves 52 and 54 shown in FIG. 1. The valves 52 and 54, which are shown by way of example and not limitation, include valve stems 52a and 54a, valve springs 52b and 54b, and valve head portions 52c and 54c. The upper portions of the valve stems 52a and 54a are arranged so as to contact the electromechanical actuators 202 and 204, each of which include electromagnetic coils 202a, 204a, 202b and 204b, and actuator components 202c, 204c, 202d and 204d. Depending upon the current (control) signals provided to the actuators 202 and 204, the valves 52 and 54 are actuated into "opened" or "closed" positions relative to corresponding valve seats 205 and 206 disposed on the inside of the cylinder block 208.

Referring again to FIG. 1, a starting system is provided for starting the camless internal combustion engine 10. The system is used to implement the method shown in FIG. 3, which includes the steps of: positioning each of the engine's intake and exhaust valves to a predetermined valve initial position, step 310; rotating the engine's crankshaft via a starter to a target idle speed for the engine, step 320; activating each of the valves in accordance with a predetermined valve activation sequence when the rotational speed of the crankshaft equals or exceeds the target idle speed, step 330; and activating each of the cylinders in accordance with a predetermined cylinder activation sequence after the valves have been activated, step 340. The system and method of the present invention are now described in detail with further reference to FIGS. 1 and 3.

The system in accordance with a preferred embodiment includes a start switch 72 that is used by the operator to complete an electrical circuit between a battery 74 and a starter motor. The starter motor can be any conventional starter, including integrated starter/alternators, and is provided an electrical "start" signal when the switch is placed in the "start" position. Mechanically coupled to the starter via a corresponding transmission system is the engine's crankshaft, which is rotated by the starter motor to a target idle speed. Also provided are an engine position sensor 118 coupled to crankshaft 13 for indicating the speed of the rotating crankshaft, i.e., the operating speed (N) of the internal combustion engine, and an engine controller 12 coupled to the sensor and the start switch for monitoring the rotational speed of the crankshaft, for sensing the start signal from the switch, and for providing the overall control functions for the operation of the engine. In a preferred embodiment as shown in FIG. 1, the engine controller 12 includes a microprocessor unit 102, input/output ports 104, random access memory (RAM) 108, read-only memory (ROM) 106, data bus 107, and a computer program embodied in the computer memory 106 and 108 for implementing the method of the present invention shown in FIG. 3.

Figure 3:
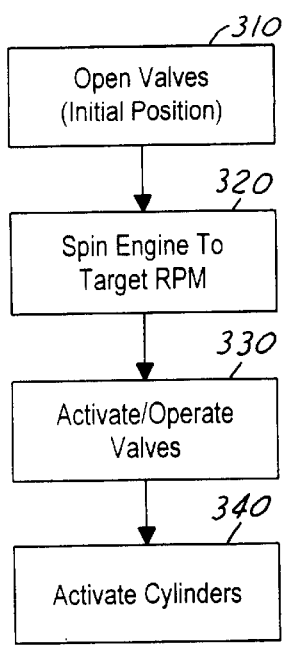
FIG. 3 is a flow chart of the preferred method in accordance with the present invention.

Referring to step 310 of FIG. 3, the engine control first provides the appropriate valve initialization control signals required to position each of the valves in accordance with a predetermined valve initial position, step 310. In accordance with the present invention, the "valve initial position" for each of the valves refers to a fully or partially opened position, i.e., a non-closed position, that allows the flow of air in and out of the corresponding cylinder. The actual positioning of the valve can be performed upon the sensing of the start signal prior to operation of the engine, or as part of a "power down" sequence for the engine occurring during a prior operation of the engine. After the valves have been placed in their initial positions, the starter motor rotates the crankshaft in response to the start signal to rotate the crankshaft to a target idle speed for the engine, step 320.

In accordance with step 320, "target idle speed" refers to the desired idle speed of the engine, and represents the threshold rotational speed of the crankshaft at which the intake and exhaust valves are actuated followed by activation of the corresponding cylinders. The starter is used to mechanically spin the crankshaft, in response to a start signal, to the target idle speed. The target speed depends on a number of factors known and understood by those of skill in the art, including the desired operation of the engine and noise and vibration considerations, and is typically 500 to 800 rotations per minute.

The controller then provides, when the rotational speed of the crankshaft equals or exceeds the target idle speed, the required valve activation control signals required to achieve proper operation of intake and exhaust valves prior to activation of the cylinders (combustion), step 330. The valve activation control signals are provided in accordance with a "valve activation sequence," which is defined as the order used to electronically activate, by cylinder, each of the intake and exhaust valves. The sequence, for example, may require that intake valves be activated first, followed by the exhaust valves, or require that visa versa, or that all of the valves for a given cylinder be activated simultaneously.

Next, in accordance with step 340 of the preferred method, each of the cylinders of the internal combustion engine is activated in accordance with a predetermined cylinder activation sequence. "Cylinder activation sequence" refers to the order used to initiate the combustion process within each of the cylinders of the camless internal combustion engine. The cylinder activation sequence defines the order in which fuel and spark ignition is provided to the various cylinders. Examples of cylinder activation sequences include the engine's cylinder firing order, every other cylinder or some other predetermined sequence.

During activation of the individual cylinders, the engine controller 12 uses idle control logic as known and appreciated in the art to derive fuel pulse width (FPW) and spark control signals required to operate the engine at the target idle speed. The appropriate control signals are then provided to corresponding fuel injectors (only one shown) and an ignition system 64, the ignition system 64 in turn providing spark ignition signals to spark plugs 62 (only one shown) in accordance with the above-described cylinder activation sequence.

Figure 4:
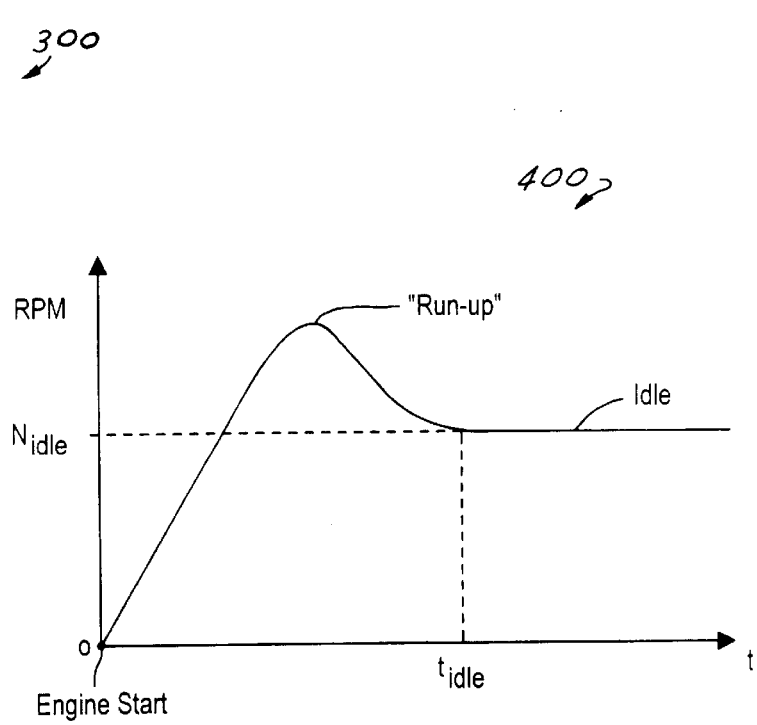
FIG. 4 is a plot of engine speed versus time for an engine using a conventional engine start-up method.
Figure 5:
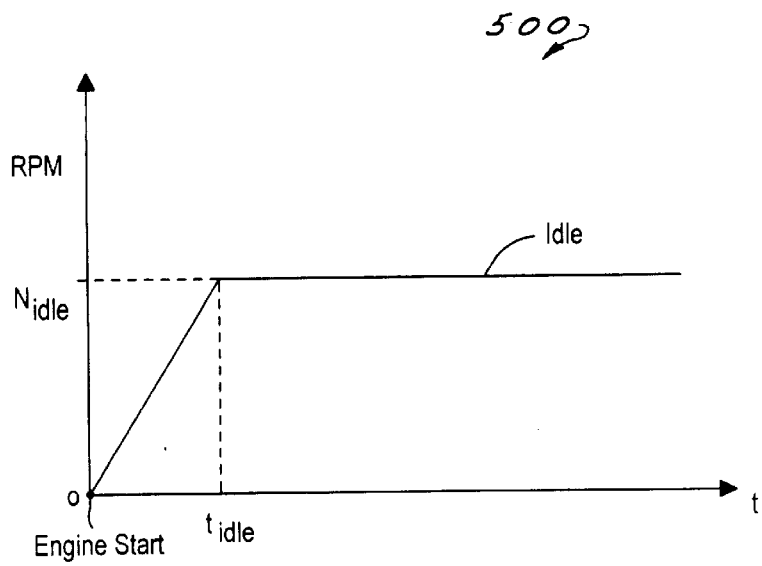
FIG. 5 is a plot of engine speed versus time for an engine using a preferred method of the present invention.

FIGS. 4 and 5 are plots of engine speed versus time showing an advantage of the method of the present invention. FIG. 4 shows a plot 400 of engine speed (revolutions per minute) versus time (seconds) for an engine using a conventional engine start-up method, and FIG. 5 shows a similar plot 500 for an engine using a preferred method of the present invention. Each plot is shown starting with an "engine start" event triggered by the placement of the start or ignition switch in the "start" position, and ending with the engine operating at a target idle speed, $N_{idle}$. FIG. 4 however shows that prior to achieving the target idle speed, the actual engine speed surpasses or "runs-up" past the target idle speed before a steady-state idling is attained. Startup and idling is also delayed as indicated by the longer time $t_{idle}$. This occurs primarily because of the excess mechanical work required to actuate the intake and exhaust valves of the engine through one or more compression strokes of the various cylinders prior to the actual start of the combustion process. In contrast, as indicated by FIG. 5, the method of the present invention allows an engine to be started more efficiently by avoiding engine "run-up and shortening the amount of time required to achieve steady-state idling.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed is:

1. A method for starting a camless internal combustion engine in response to a start signal, the internal combustion engine having a crankshaft and a plurality of cylinders each having one or more actuators for electronically actuating corresponding intake and exhaust valves, the internal combustion engine being mechanically coupled via the crankshaft to a starter motor, the starter motor being activated in response to the start signal, said method comprising:

positioning each of the valves in accordance with a predetermined valve initial position, the valves being positioned so as to allow the flow of air in and out of each of the cylinders, said step of positioning the valves comprising the step of positioning each of the valves at the conclusion of a prior operation of the internal combustion engine;

rotating the crankshaft via the starter motor to a target idle speed for the engine;

activating each of the valves in accordance with a predetermined valve activation sequence when the rotational speed of the crankshaft equals or exceeds the target idle speed; and activating each of the cylinders in accordance with a predetermined cylinder activation sequence after the valves have been activated.

2. The method according to claim 1, wherein the step of positioning the valves comprises:

generating valve initialization control signals for each of the actuators; and applying the valve initialization control signals to each of the actuators to position the corresponding intake and exhaust valves.

3. A system for starting a camless internal combustion engine in response to a start signal, the internal combustion engine having a crankshaft and multiple cylinders each having one or more actuators for electronically actuating corresponding intake and exhaust valves, said system comprising:

a start switch for generating the start signal;

a starter motor electrically coupled to the start switch and mechanically coupled to the crankshaft for rotating the crankshaft to a target idle speed, said starter motor being activated in response to the start signal;

a sensor for indicating the speed of the rotating crankshaft; and an engine controller coupled to said sensor and said start switch for monitoring the rotational speed of the crankshaft and for sensing the start signal, for providing valve initialization control signals to position each of the valves in accordance with a predetermined valve initial position, the valves for each of the cylinders being positioned so as to allow the flow of air in and out of each of the cylinders, for providing valve activation control signals to each of the valves when the rotational speed of the crankshaft equals or exceeds the target idle speed, and for activating each of the cylinders after the valves have been activated, said controller comprising:

means for sensing the start signal;

means for providing valve initialization control signals to each of the actuators to position each of the valves in accordance with the predetermined valve initial position after the start signal is sensed;

means for comparing the rotational speed of the crankshaft to the target idle speed;

means for providing valve activation control signals to each of the actuators to activate the valves in accordance with a predetermined valve activation sequence when the rotational speed of the crankshaft equals or exceeds the target idle speed;

means for activating each of the cylinders after the valves have been activated; and means for positioning each of the valves in accordance with the predetermined valve initial position at the conclusion of a prior operation of the internal combustion engine.

4. The system according to claim 3, wherein said engine comprises corresponding fuel injectors and spark plugs for said cylinders and said cylinder activating means comprises:

means for providing fuel control signals to said fuel injectors; and means for providing spark ignition control signals to said spark plugs.

5. The system according to claim 3, further comprising means for disabling the starter when the rotational speed of the crankshaft equals or exceeds the target idle speed.

6. An article of manufacture for starting a camless internal combustion engine in response to a start signal, the internal combustion engine having a crankshaft and multiple cylinders each having one or more actuators for electronically actuating corresponding intake and exhaust valves, the internal combustion engine being mechanically coupled via the crankshaft to a starter motor, the starter motor being activated in response to the start signal, said article of manufacture comprising:

a computer usable medium; and a computer readable program code embodied in said computer usable medium for directing the computer to perform the steps of monitoring the rotational speed of the crankshaft and for sensing the start signal, for providing valve initialization control signals to position each of the valves in accordance with a predetermined valve initial position at the conclusion of a prior operation of the internal combustion engine, the valves for each of the cylinders being positioned so as to allow the flow of air in and out of each of the cylinders, for providing valve activation control signals to each of the valves when the rotational speed of the crankshaft equals or exceeds the target idle speed, and for activating each of the cylinders after the valves have been activated.

* * * * *